United States Patent
Milder et al.

(10) Patent No.: US 9,140,503 B2
(45) Date of Patent: Sep. 22, 2015

(54) ENERGY MEASUREMENT SYSTEM FOR FLUID SYSTEMS

(75) Inventors: Fredric Milder, Galisteo, NM (US);
Bristol Stickney, Tesuque, NM (US)

(73) Assignee: SolarLogic, LLC, Santa Fe, NM (US)

( * ) Notice: Subject to any disclaimer, the term of this patent is extended or adjusted under 35 U.S.C. 154(b) by 352 days.

(21) Appl. No.: 13/438,081

(22) Filed: Apr. 3, 2012

(65) Prior Publication Data
US 2013/0255908 A1   Oct. 3, 2013

(51) Int. Cl.
*F28F 27/00* (2006.01)
*G01K 17/10* (2006.01)
*F28D 15/00* (2006.01)

(52) U.S. Cl.
CPC ............... *F28F 27/00* (2013.01); *F28D 15/00* (2013.01); *G01K 17/10* (2013.01); *F24D 2200/14* (2013.01); *F24D 2240/00* (2013.01)

(58) Field of Classification Search
CPC .............. F28F 27/00; F24H 1/00; F24H 1/22; F24H 7/00; F24H 7/02; F24J 2/00; F24J 2/04; F24F 11/001; F24F 11/006; F24F 11/0086; F25B 2600/19; F25B 2700/13; F25B 2700/2116; F25B 2700/21162; F25B 2700/21163; F25B 2700/2117; F25B 2700/21174; F25B 2700/21175; F28D 15/00; G01K 17/10; G01K 17/08; G01K 17/06; F24D 12/02; F24D 12/00; F24D 17/00; F24D 17/0015; F24D 17/0026; F24D 17/0036; F24D 17/0042; F24D 17/0078; F24D 2200/04–2200/044; F24D 2240/00; F24D 19/1006; F24D 19/1009; F24D 19/1051; F24D 2200/14

USPC ............... 165/11.1, 11.2, 201, 205, 208, 210, 165/253, 260, 287–290, 293, 218, 219, 165/295–297, 300
See application file for complete search history.

(56) References Cited

U.S. PATENT DOCUMENTS

| | | | | |
|---|---|---|---|---|
| 3,384,155 A | * | 5/1968 | Newton | 165/208 |
| 3,742,188 A | | 6/1973 | Sundbye | |
| 3,906,742 A | * | 9/1975 | Newton | 62/332 |
| 4,111,259 A | * | 9/1978 | Lebduska | 237/1 R |
| 4,363,441 A | | 12/1982 | Feinberg | |
| 4,702,306 A | * | 10/1987 | Herzog | 165/279 |
| 5,347,825 A | | 9/1994 | Krist | |

(Continued)

OTHER PUBLICATIONS

International Search Report and Written Opinion dated Jun. 14, 2013 for International Application No. PCT/US2013/032919, International Filing Date Mar. 19, 2013, consisting of 8 pages.

*Primary Examiner* — Tho V Duong
*Assistant Examiner* — Aaron Isenstadt
(74) *Attorney, Agent, or Firm* — Christopher & Weisberg, P.A.

(57) ABSTRACT

A primary fluid flow loop and a secondary fluid flow loop fluidly coupled to the primary fluid flow loop. The secondary fluid flow loop exchanges heat with at least one of a heat source and a heat load. The secondary fluid flow loop includes an inlet and an outlet fluidly coupling the primary fluid flow loop to the secondary fluid flow loop. A fluid flow meter coupled to the primary fluid flow loop. A first temperature sensor coupled to the primary fluid flow loop, the first temperature sensor measures the temperature of a fluid flowing in the primary fluid flow loop upstream of the inlet of the secondary fluid flow loop. A second temperature sensor coupled to the primary fluid flow loop, the second temperature sensor measures the temperature of the fluid flowing in the primary fluid flow loop downstream of the outlet of the secondary fluid flow loop.

12 Claims, 2 Drawing Sheets

(56) References Cited

U.S. PATENT DOCUMENTS

| | | | |
|---|---|---|---|
| 5,714,685 A * | 2/1998 | Hobro et al. | 73/204.13 |
| 6,299,071 B1 * | 10/2001 | Fiedrich | 237/8 R |
| 7,658,335 B2 * | 2/2010 | Johnson, Jr. | 237/8 R |
| 2007/0074863 A1 * | 4/2007 | Ichinose et al. | 165/247 |
| 2008/0179415 A1 | 7/2008 | Johnson | |
| 2009/0287355 A1 * | 11/2009 | Milder et al. | 700/277 |
| 2010/0314094 A1 * | 12/2010 | Hall | 165/293 |
| 2011/0172830 A1 | 7/2011 | Milder et al. | |

* cited by examiner

ENERGY MEASUREMENT SYSTEM FOR FLUID SYSTEMS

CROSS-REFERENCE TO RELATED APPLICATION n/a

STATEMENT REGARDING FEDERALLY SPONSORED RESEARCH OR DEVELOPMENT n/a

FIELD OF THE INVENTION

The present invention relates to a method and system for measuring energy transfer in fluid heating and cooling systems.

BACKGROUND OF THE INVENTION

Some homes and businesses employ hydronic (water-based) or other fluid heating systems to heat living spaces, pools, spas, walkways, driveways, hot water for washing, etc., or for process heat. Fluid heating systems distribute heated fluid through a series of heat exchanging pipes that are positioned throughout the heating loads. Conventional hydronic systems use on-demand sources, such as boilers and chillers, to thermally adjust fluids that circulate throughout the system.

In fluid heating and cooling systems it is desirable to measure the heat energy transferred into and out of each heat source and load. Measuring and monitoring heat transfer from a fluid system is necessary for receiving financial rebates, such as renewable energy credits, as well as for controlling the various heat sources and loads.

For fluid systems having multiple heat sources and loads, measuring and monitoring heat energy transfer from each of the heat sources and loads may be expensive. In particular, because available energy meters, such as a British Thermal Unit (BTU) meters, need to be affixed to the fluid system at each measurement point, for example, at each heat source or load, a system may often include several expensive BTU meters.

In general, a BTU meter includes a flow meter and a temperature sensor, the data from which are combined according to mathematical formula to determine the heat energy transfer from a particular heat source or load. The flow meter component of the BTU meter is expensive, with the temperature sensors being a comparably inexpensive component. In particular, a current fluid system having three heat loads requires three expensive flow meters and six thermistors to accurately measure the heat consumption of each load.

Therefore, what is needed is an effective and cost efficient heat energy measurement system that reduces the number of flow meters in the system without losing measurement accuracy.

SUMMARY OF THE INVENTION

The present invention advantageously provides for an energy measurement system and method for a fluid heating and cooling system. The system includes a primary fluid flow loop. At least one secondary fluid flow loop is included and fluidly coupled to the primary fluid flow loop. The secondary fluid flow loop exchanges heat with at least one of a heat source and a heat load. The secondary fluid flow loop includes an inlet and an outlet fluidly coupling the primary fluid flow loop to the secondary fluid flow loop. A fluid flow meter coupled to the primary fluid flow loop is included. A first temperature sensor is coupled to the primary fluid flow loop, the first temperature sensor measuring the temperature of a fluid flowing in the primary fluid flow loop upstream of the inlet of the secondary fluid flow loop. A second temperature sensor is coupled to the primary fluid flow loop, the second temperature sensor measuring the temperature of the fluid flowing in the primary fluid flow loop downstream of the outlet of the secondary fluid flow loop.

In another embodiment, a method includes coupling a fluid flow meter to a primary fluid flow loop, the primary fluid flow loop being fluidly coupled to a secondary fluid flow loop, the secondary fluid flow loop including an inlet and an outlet fluidly coupling the primary fluid flow loop and the secondary fluid flow loop, the secondary fluid flow loop exchanging heat with at least one of a heat source and a heat load. A first temperature sensor is coupled to the primary fluid flow loop upstream of the inlet and measures the fluid flow rate with the fluid flow meter. The temperature of a fluid flowing in the primary fluid flow loop upstream of the inlet is measured with the first temperature sensor. A second temperature sensor is coupled to the primary fluid flow loop downstream of the secondary loop outlet coupling. The temperature of the fluid flowing in the primary fluid flow loop downstream of the outlet is measured with the second temperature sensor.

In yet another embodiment, the system includes a primary fluid flow loop. A plurality of secondary fluid flow loops are fluidly coupled to the primary fluid flow loop, each secondary fluid flow loop exchanging heat with at least one of a heat source and a heat load, each secondary fluid flow loop including an inlet and an outlet fluidly coupling the primary fluid flow loop to the secondary fluid flow loop. A fluid flow meter is coupled to the primary fluid flow loop, the fluid flow meter being positioned on the primary fluid flow loop at any position other than between the inlet and outlet of each secondary fluid flow loop. A first temperature sensor is coupled to the primary fluid flow loop, the first temperature sensor measures the temperature of a fluid flowing in the primary fluid flow loop upstream of the inlet of the secondary fluid flow loop. A second temperature sensor is coupled to the primary fluid flow loop, the second temperature sensor measures the temperature of the fluid flowing in the primary fluid flow loop downstream of the outlet of the secondary fluid flow loop. A second primary fluid flow loop exchanging heat with the first primary fluid flow loop is included. One or more solar collectors is included and exchanging heat with the second primary fluid flow loop.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
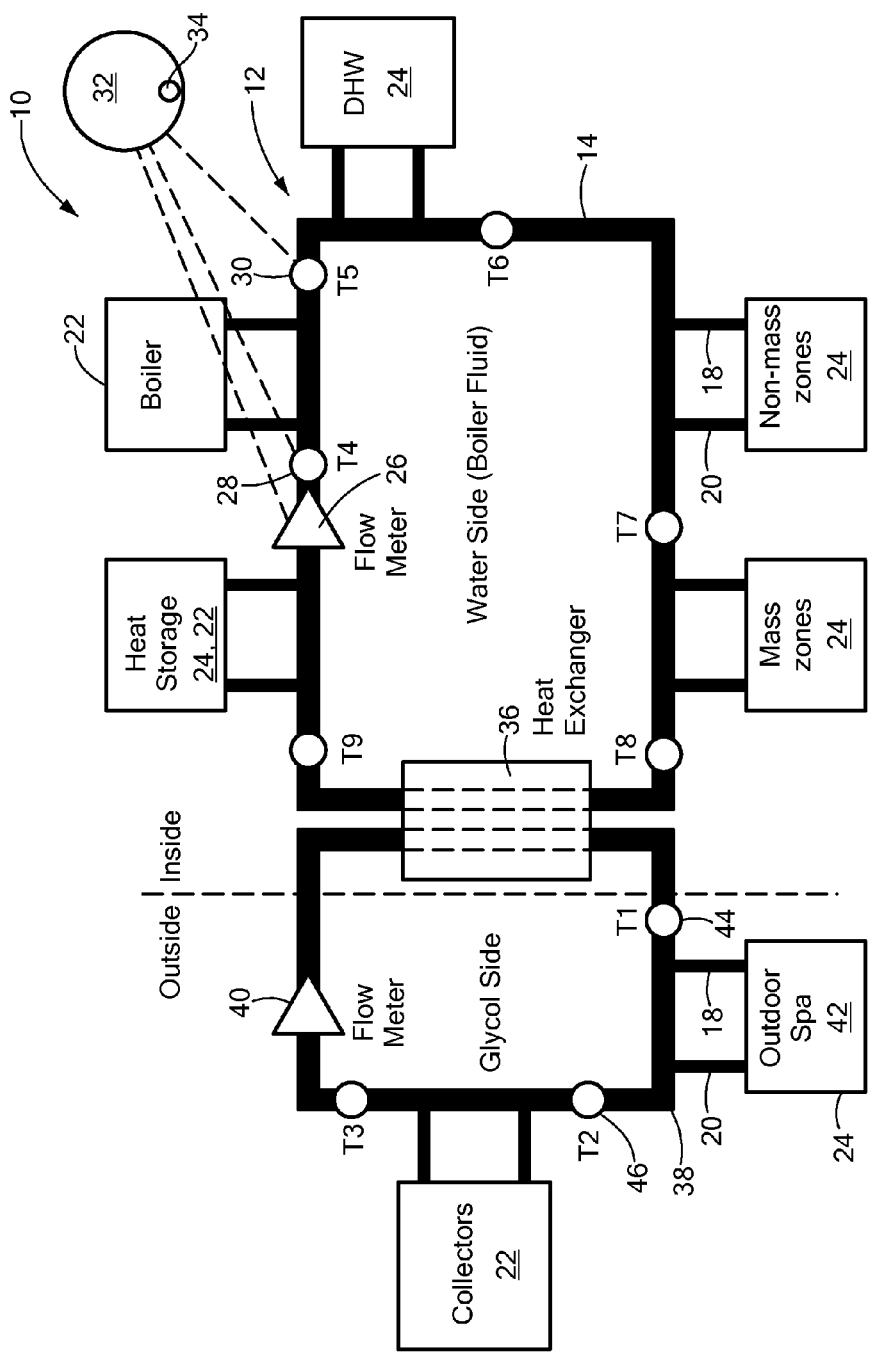
FIG. 1 is a system schematic of an exemplary energy measurement system for a fluid heating and cooling system constructed in accordance with the principles of the present invention.

Now referring to the drawings in which like reference designators refer to like elements, there is shown in FIG. 1 a schematic of an exemplary energy measurement system for a hydronic system constructed in accordance with the principles of the present invention and designated generally as "10." Of note, the system components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Moreover, while certain embodiments or figures described herein may illustrate features not expressly indicated on other figures or embodiments, it is understood that the features and components of the system and devices disclosed herein may be included in a variety of different combinations or configurations without departing from the scope and spirit of the invention.

The system 10 may be associated with or otherwise in communication with a fluid heating and cooling system 12 for a house or other building. The fluid system 12 may include insulated and non-insulated thermally conductive pipes of varying diameters and sizes to circulate a working fluid to various system components. In particular, a working fluid such as boiler fluid or water is circulated by the fluid system 12, by for example a pump, around a primary fluid flow loop 14. In the exemplary embodiment shown in FIG. 1, the primary fluid flow loop 14 is a closed loop fluid piping system that circulates the working fluid at a programmed or predetermined flow rate. For example, the working fluid may be circulated at a constant flow rate or a variable flow rate depending on the energy demand of particular loads and sources in thermal communication with the primary fluid flow loop 14. As such, the flow rate of the working fluid may be different depending on the time of day, available power sources, operating loads, etc.

Fluidly coupled to the primary fluid flow loop 14 are one or more secondary fluid flow loops 16. Each secondary fluid flow loop 16 may include piping of the same, smaller, or larger diameter than that of the primary fluid flow loop 14 such that flow of fluid into the secondary fluid flow loop 16 may be accelerated or decelerated depending on the desired rate of heat transfer from the working fluid. Each secondary fluid flow loop 16 may include an inlet 18, which diverts a portion of the fluid flow from the primary fluid flow loop 14 into the secondary fluid flow loop 16, and an outlet 20 directing the flow of fluid exiting the secondary fluid flow loop 16 back into the primary fluid flow loop 14. In an exemplary embodiment, each secondary fluid flow loop 16 includes a single inlet 18 and a single outlet 20, but it is further contemplated that more than one inlet 18 and outlet 20 may be included with each secondary fluid flow loop 16.

The secondary fluid flow loop 16 may be in thermal communication with at least one of a heat source 22 and a heat load 24. For example, in an exemplary fluid system 12, heat sources 22 may include a heat storage unit and a boiler generating heat from the combustion of renewable or non-renewable resources, among other heat sources 22. Exemplary heat loads include domestic hot water, a heat storage tank, mass zones, such as radiant heating of a concrete slab, and non-mass zones in the household such as baseboard heaters. The secondary fluid flow loop 16 may selectively exchange heat with one or more of the heat sources 22 and loads 24 with user control of the fluid system 12. For example, one or more controllable valves (not shown) may in fluid communication with the primary fluid flow loop 14 to facilitate or prevent the flow of fluid into the inlets 18 of each secondary fluid flow loop 16.

Coupled to the primary fluid flow loop 14 is a fluid flow meter 26. Although illustrated in the drawings by convention as a sideways triangle, it is understood that flow meter 26 may be any meter known in the art that may measure the volume flow rate of the fluid flowing through the primary fluid flow loop 14. In an exemplary embodiment, one flow meter 26 is coupled to or otherwise in communication with a fluid flow circulating through the primary fluid flow loop 14. Owing to the fact that the primary fluid flow loop 14 is a closed loop system, the flow meter 26 may be positioned at any location along the primary fluid flow loop 14 to measure the fluid flow as long as the fluid flow meter 26 is not positioned between the inlet 18 and the outlet 20 of any of the secondary loops 16. The flow meter 26 may be operable to measure the flow of fluid whether the fluid is flowing clockwise or counter-clockwise within the primary fluid flow loop 14.

Coupled to or otherwise in communication with the primary fluid flow loop 14 are at least a first temperature sensor 28 and a second temperature sensor 30. The first temperature sensor 28 and the second temperature sensor 30 may be thermistors or thermocouples operable to measure the temperature of the fluid flowing within the primary fluid flow loop 14 at various positions. In an exemplary embodiment, the first temperature sensor 28 may be positioned on or within the primary loop 14 at a position upstream from the inlet 18 of a particular heat source 22 or heat load 24. For example, each heat source 22 or heat load 24 may include at least one first temperature sensor 28 upstream from its corresponding inlet 18 such that the temperature of the fluid entering each particular heat source 22 or heat load 24 may be measured. The working fluid entering the inlet 18 and circulating through the secondary fluid flow loop 16 may exchange heat with the heat source 22 or heat load 24 because the piping of the secondary flow loop 16 is sufficiently thin to facilitate heat transfer from or to the working fluid.

After the working fluid exchanges heat with the heat source 22 or the heat load 24 of the secondary fluid flow loop 16, the temperature of the working fluid may change as it exits the secondary fluid flow loop 16 through the outlet 20. The second temperature sensor 30 may be positioned on or within the primary loop 14 at a position downstream from the outlet 20 to measure the temperature of the fluid flowing in the primary fluid flow loop 14 after mixing of the secondary loop 16 fluid flowing out of the outlet 20 with the primary loop 14. The change in temperature of the primary loop 14 fluid from just upstream of the inlet 18, where it enters the secondary loop 16, to just downstream of the outlet 20, where it exits the secondary loop 16, may be directly correlated along with the measured fluid flow within the primary loop 14 to an energy consumption rate of the heat source 22 or heat load 24 on the secondary loop 16. In particular, the portion of the primary fluid flow loop 14 disposed between the inlet 18 and the outlet 20 may be insulated and/or sufficiently thick such that minimal or negligible heat transfer occurs from the working fluid when circulating through the primary fluid flow loop 14 between the inlet 18 and the outlet 20 of the secondary loop 16.

Optionally, the entire primary fluid flow loop 14 may be insulated such that minimal or negligible heat transfer occurs from the working fluid at any portion of the primary fluid flow loop 14. The temperature measurement of the working fluid at the second temperature sensor 30 represents both temperature of the fluid in the primary fluid flow loop 14 after mixing of one of the secondary loop 16 outlet's 18 fluid flowing into the primary loop 14 exiting a first heat source 22 or heat load 24 of another heat source 22 or heat load 24 as well as the inlet 18 temperature of a second heat source 22 or heat load 24. For example, as shown in FIG. 1, six temperature sensors are shown coupled to the primary fluid flow loop 14 and labeled as T4-T9. The measured temperature at T4 represents both the temperature of the working fluid downstream of the outlet 20 of the heat storage heat source 22 and the temperature of the working fluid flowing into the boiler 22. Similarly, the measured temperature at T5 represents both the temperature of the working fluid in the primary fluid flow loop 14 downstream of the outlet 20 of the boiler heat source 22 and the temperature of the working fluid flowing into the domestic hot water heat load 24. Accordingly, the exemplary system 10 in FIG. 1 includes three heat loads 24, one heat source 22, and a heat storage tang that can be either a heat load 24 or a heat source 22 and different moments during operation of the system 12, and includes six temperature sensors and one flow meter 26 to measure the energy consumption of each of the heat sources 22 and heat loads 24.

The first temperature sensor 28 and the second temperature sensor 30 and the flow meter 26 may each be in electrical or wireless communication with an energy measurement unit 32, the energy measurement unit having a processor 34 configured to correlate the measured temperatures and the flow rate to an energy consumption rate or other energy related data. The energy measurement unit 32 may further be operable to display the instantaneous, average, or cumulative energy consumption or consumption rates for each heat source 22 or heat load 24 at any point in time.

Continuing to refer to FIG. 1, the primary fluid flow loop 14 may be in thermal communication with a heat exchanging element 36, such as a coil or other thermally conductive component. The heat exchange element 36 operably and thermally connects the primary fluid flow loop 14 to a second primary fluid flow loop 38. For example, as shown in FIG. 1, the heat exchange element 36 provides a thermally conductive medium through which the working fluid circulating within the primary fluid flow loop 14 and a working fluid, such as glycol, circulating within the second primary fluid flow loop 28, exchange heat. The second primary fluid flow loop 38 may be at least partially disposed outside of the building or house in which the fluid system 12 is installed and the primary fluid flow loop 14 may be disposed within the house or building.

A second fluid flow meter 40 may be coupled to the second primary fluid flow loop 38 to measure the flow rate of the circulating glycol. The second flow meter 40 may be positioned at any position along the second primary fluid flow loop 38. A tertiary fluid flow loop 42 may be fluidly coupled to the second primary fluid flow loop 38 in a similar or the same manner as the secondary fluid flow loop 16 is fluidly coupled to the primary fluid flow loop 14. For example, the tertiary fluid flow loop 42 may include an inlet 18 and an outlet 20 fluidly coupling the tertiary fluid flow loop 42 to the second primary fluid flow loop 38. A heat source 22 or a heat load 24 may be in thermal communication with the tertiary fluid flow loop 42. In an exemplary embodiment, the second flow meter 40 may be positioned at any position along the second primary fluid flow loop 38, so long as it is not being between an inlet 18 and outlet 20 of any tertiary fluid flow loop 42. For example, an outdoor spa or other heat load 24 may be in thermal communication with the tertiary fluid flow loop 42 which may transfer heat from the heated glycol fluid to the spa. A renewable heat source 22 may be in thermal communication with the glycol circulating within the tertiary fluid flow loop 42. For example, solar collectors may be integrated with the tertiary fluid flow loop 42 to heat the glycol. In particular, one or more solar panels may be angled or otherwise positioned on the roof of a building to collect solar rays and transfer solar energy to the glycol fluid. It is further contemplated that other heat generating sources 22 or loads 24 may be in fluid communication with the tertiary loop 42 to either heat or cool the circulating glycol.

A third temperature sensor 44 and a fourth temperature sensor 46 may be coupled to the second primary fluid flow loop 38 in a similar manner compared to the first temperature sensor 28 and the second temperature sensor 30. In particular, the third temperature sensor 44 and the fourth temperature sensor 46 may be thermistors operable to measure the temperature of the fluid flowing within the second primary fluid flow loop 38 at various positions. In an exemplary embodiment, the third temperature sensor 44 may be positioned on or within the second primary loop 28 at a position upstream from the inlet 18 of a particular heat source 22 or heat load 24. For example, each heat source 22 or heat load 24 may include at least one third temperature sensor 44 upstream from its corresponding inlet 18 such that the temperature of the glycol fluid entering each particular heat source 22 or heat load 24 may be measured. The glycol fluid entering the inlet 18 and circulating through the tertiary fluid flow loop 42 may exchange heat with the heat source 22 or heat load 24 because the piping of the tertiary fluid flow loop 42 is sufficiently thin to facilitate heat transfer from or to the working fluid.

After the working fluid exchanges heat with the heat source 22 or the heat load 24, for example, the outdoor spa of the tertiary fluid flow loop 42, the temperature of the glycol fluid may change as it exits the tertiary fluid flow loop 42 through the outlet 20. The fourth temperature sensor 46 may be positioned on or within the second primary loop 38 at a position downstream from the outlet 20 to measure the temperature of the fluid in the second primary loop 38 after the mixing of the tertiary fluid flow loop 42 fluid exiting the outlet 20 with the secondary primary fluid flow loop 38. The change in temperature of the fluid in the second primary fluid flow loop 38 from just before it enters the tertiary loop 42 to just after it exits the tertiary loop 42 may be directly correlated along with the measured fluid flow to an energy consumption rate of each heat source 22 or heat load 24.

For example, as shown in FIG. 1, three temperature sensors are shown coupled to the second primary fluid flow loop 38 and labeled as T1-T3. The measured temperature at T2 represents both the temperature of the second primary fluid flow loop 38 glycol fluid downstream of the outlet 20 of the outdoor spa 24 and the temperature of the working glycol flowing in the second primary fluid flow loop 38 before entering the collectors 22. The measured temperatures at T3 and T1 may not necessarily be the same temperature as heat may be transferred from the second primary fluid flow loop 38 to the primary fluid flow loop 14 through the heat exchanging element 36. The glycol fluid circulating at T3 may travel from outside of the building to inside of the building to exchanging heat with the primary fluid flow loop 14.

The second flow meter 40, the third temperature sensor 44, and the fourth temperature sensor 46 may further being in communication the energy measurement 32 and the processor 34 such that the temperatures at T1-T3 may be correlated to an energy consumption rate in the second primary fluid flow loop 38. Moreover, temperatures at T1-T9 as well as the flow rates measured from the two flow meters 26 and 40, may be correlated by the processor 34 to determine the overall energy consumption and transfer rates of the system 10 in both the primary fluid flow loop 14 and the second primary fluid flow loop 38 in addition to the energy consumption and transfer rate of each secondary, tertiary and primary loop.

Figure 2:
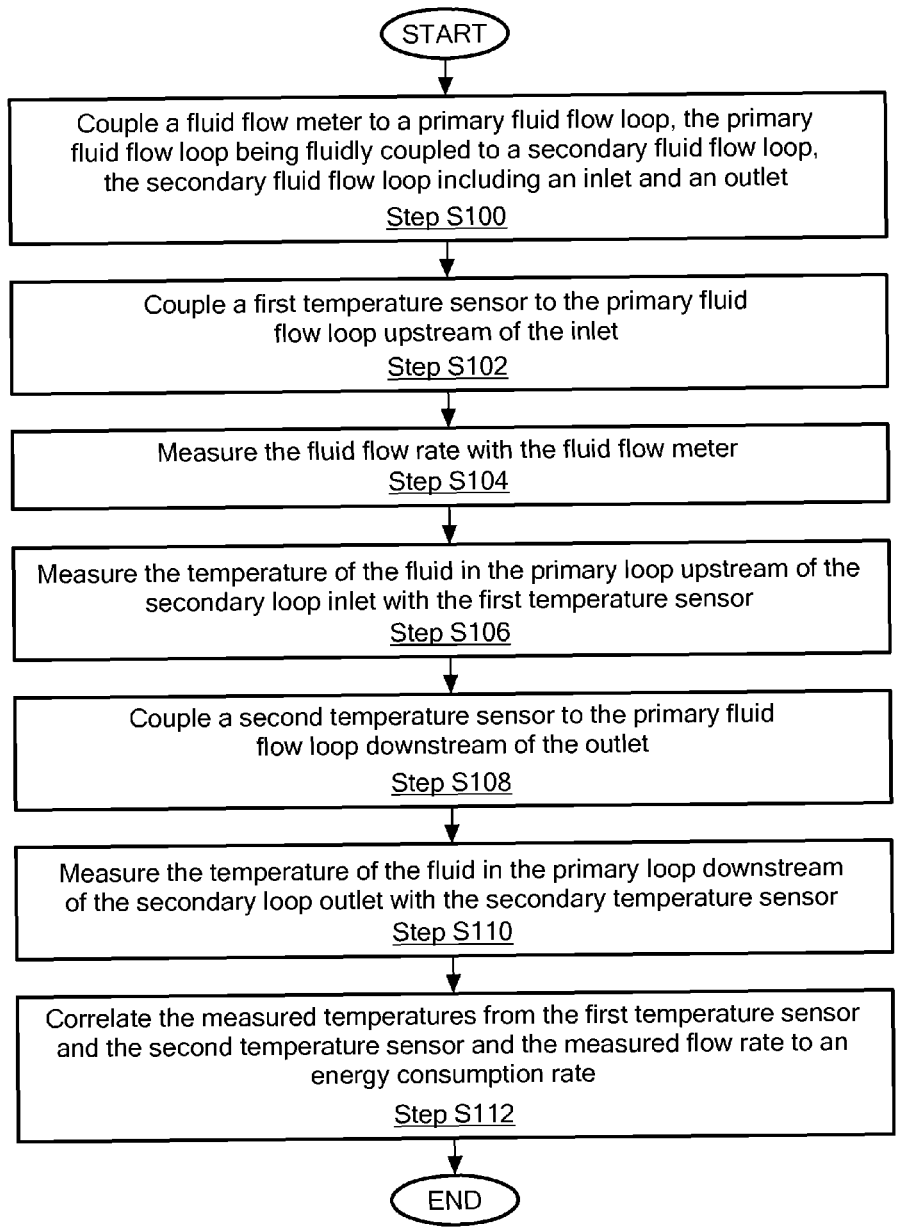
FIG. 2 is a flow chart showing and exemplary method of measuring and calculating an energy consumption rate of each of the heating sources and loads of a fluid heating and cooling system.

Now referring to FIG. 2, an exemplary method of calculating an energy consumption rate of sources 22 and loads 24 of the primary fluid flow loop 14 includes coupling the fluid flow meter 26 to the primary fluid flow loop 14 (Step 100). The primary fluid flow loop 14 is fluidly coupled to the secondary fluid flow loop 16. The secondary fluid flow loop 16 includes the inlet 18 and the outlet 20 fluidly coupling the primary fluid flow loop 14 and the secondary fluid flow loop 16. The secondary fluid flow loop 16 exchanges heat with at least one of the heat sources 22 and the heat loads 24. The first temperature sensor 28 is coupled to the primary fluid flow loop 14 upstream of the inlet 18 (Step 102). As discussed above, a thermistor may be coupled upstream from each inlet 18 of each secondary loop 16. The fluid flow rate is measured with the fluid flow meter 26 (Step 104). The temperature of a fluid flowing into the inlet 18 is measured with the first temperature sensor 28 (Step 106). A second temperature sensor 30 is coupled to the primary fluid flow loop 14 downstream of the outlet 20 (Step 108). As discussed above, a thermistor may be coupled downstream from each outlet 20 of each secondary loop 16. The temperature of the fluid flowing in the primary loop 14 after the mixing of the secondary loop 16 outlet's 20 fluid with the primary loop 14 is measured with the second temperature sensor 30 (Step 110).

The measured temperatures from the first temperature sensor 28 and the second temperature sensor 30 and the measured flow rate may be correlated by the processor 24 to an energy consumption or transfer rate for the system 10 and/or each individual heat source 22 and heat load 24 (Step 112). In an exemplary calculation, the measured temperature and flow rate data are measured every second or any predetermined time interval (Y). For example, the measured temperature at T4 ($T_x$) may be subtracted from the measured temperature at T5 ($T_{x+1}$) and multiplied by the flow rate (F), time (Y) and a constant (K) to convert the calculated quantity into units, for example, BTUs, KWH, for each heat source 22 or load 24. Thus, the equation $K*Y*(T_{x+1}-T_x)*F$ is used to calculate the energy contribution rate for each heat source 22 or the energy consumption rate for each heat load 24, or the energy transfer rate between the second primary fluid flow loop 38 and the first primary loop 14 across the heat exchanger 36. Based on the measured energy consumption rate, the fluid flow rate and/or the operation of each heat source 22 and heat load 24 may be further modified or terminated based on the measured energy consumption rate. For example, if a particular heat load 24 is consuming too much energy, the particular load 24 may be shut down by operation of one or more controls on the energy measurement 32 or another control device.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. An energy measurement system for a fluid heating and cooling system, comprising:
    a primary fluid flow loop;
    a first secondary fluid flow loop and a second secondary fluid flow loop each being fluidly coupled to the primary fluid flow loop, the first secondary fluid flow loop exchanging heat with a heat load and the second secondary fluid flow loop exchanging heat with a heat source, the first and second secondary fluid flow loops each including an inlet and an outlet fluidly coupling the primary fluid flow loop to each of the first and second secondary fluid flow loops;
    a fluid flow meter coupled to the primary fluid flow loop between at least one of the outlet of the first secondary fluid flow loop and the inlet of the second secondary fluid flow loop and the outlet of second secondary fluid flow loop and the inlet of the first secondary fluid flow loop, the flow meter measuring a volumetric fluid flow of the flow within the primary loop at the position of the flow meter;
    a first temperature sensor coupled to the primary fluid flow loop, the first temperature sensor measuring the temperature of a fluid flowing in the primary fluid flow loop upstream of the inlet of the first secondary fluid flow loop;
    a second temperature sensor coupled to the primary fluid flow loop, the second temperature sensor measuring the temperature of the fluid in the primary fluid flow loop flowing downstream of the outlet of the first secondary fluid flow loop;
    a third temperature sensor coupled to the primary fluid flow loop, the third temperature sensor measuring the temperature of the fluid flowing in the primary fluid flow loop downstream of the outlet of the second secondary fluid flow loop; and
    a processor in communication with the first, second, and third temperature sensors and the fluid flow meter, the processor being configured to:
        multiply the difference between the measured temperatures of the second and first temperature sensors by the volume flow measured by the flow meter to determine the thermal energy consumption rate of the heat load of the first secondary flow loop; and
        multiply the difference between the measured temperatures between the third and second temperature sensors by the volume measured by the flow meter to determine the thermal energy generation rate of the heat source of the second secondary flow loop.

2. The system of claim 1, further including a heat exchange element exchanging heat with the primary fluid flow loop.

3. The system of claim 1, further comprising a second primary fluid flow loop in thermal communication with the primary fluid flow loop; and wherein the second primary fluid flow loop exchanges heat with the primary fluid flow loop through a heat exchanging element.

4. The system of claim 3, further including a second fluid flow meter coupled to the second primary fluid flow loop.

5. The system of claim 3, further including a tertiary fluid flow loop fluidly coupled to the second primary fluid flow loop, the tertiary fluid flow loop including at least one of a heat load and a heat source; and wherein the at least one heat source on the tertiary fluid flow loop is one or more solar energy collectors.

6. The system of claim 5, wherein the tertiary fluid flow loop includes an inlet and outlet in fluid communication with the second primary fluid flow loop.

7. A method of measuring at least one of energy production and consumption rate in a fluid heating or cooling system, comprising:
    coupling a single fluid flow meter to a primary fluid flow loop, the primary fluid flow loop being fluidly coupled to a first secondary fluid flow loop and a second secondary loop, the first secondary fluid flow loop including an inlet and an outlet fluidly coupling the primary fluid flow loop and the first secondary fluid flow loop, the first secondary fluid flow loop exchanging heat with a heat load and the second secondary flow loop exchanging heat with a heat source;

coupling a first temperature sensor to the primary fluid flow loop upstream of the inlet of the first secondary fluid flow loop;

measuring the volumetric fluid flow rate within the primary fluid flow loop at any position along the primary fluid flow loop that is not between the inlet and the outlet of the first secondary fluid flow loop and the second secondary fluid flow loop with the fluid flow meter;

measuring the temperature of a fluid flowing in the primary fluid flow loop upstream of the inlet of the first secondary fluid flow loop with the first temperature sensor;

coupling a second temperature sensor to the primary fluid flow loop downstream of the outlet of the first secondary fluid flow loop, and measuring the temperature of the fluid flowing in the primary fluid flow loop downstream of the outlet of the first secondary fluid flow loop with the second temperature sensor;

coupling a third temperature sensor to the primary fluid flow loop downstream of the outlet of the second secondary fluid flow loop;

measuring the temperature of the fluid flowing in the primary fluid flow loop downstream of the outlet of the second secondary fluid flow loop with the third temperature sensor;

multiplying the difference between the measured temperatures of the second and first temperature sensors by the volume flow measured by the flow meter to determine the energy consumption rate of the heat load of the first secondary flow loop; and multiplying the difference between the measured temperatures between the third and second temperature sensors by the volume measured by the flow meter to determine the energy generation rate of the heat source of the second secondary flow loop.

8. The method of claim 7, wherein the primary cooling loop exchanges heat with a heat exchanging element.

9. The method of claim 8, further including coupling a second fluid flow meter to a second primary fluid flow loop, the second primary fluid flow loop exchanging heat with the primary fluid flow loop through the heat exchanging element.

10. The method of claim 9, wherein the second primary fluid flow loop is fluidly coupled to a tertiary fluid flow loop, the tertiary fluid flow loop including an inlet and an outlet fluidly coupling the second primary fluid flow loop and the tertiary flow loop, the tertiary fluid flow loop exchanging heat with at least one of a heat source and a heat load.

11. The method of claim 7, further including fluidly coupling one or more solar collectors to the second primary fluid flow loop.

12. An energy measurement system for a fluid heating and cooling system, comprising:

a primary fluid flow loop;

a plurality of secondary fluid flow loops fluidly coupled to the primary fluid flow loop, each secondary fluid flow loop exchanging heat with at least one of a heat source and a heat load, each secondary fluid flow loop including an inlet and an outlet fluidly coupling the primary fluid flow loop to the secondary fluid flow loop;

a fluid flow meter coupled to the primary fluid flow loop, the fluid flow meter being positioned on the primary fluid flow loop at any position other than between the inlet and outlet of each secondary fluid flow loop;

a first temperature sensor coupled to the primary fluid flow loop, the first temperature sensor measuring the temperature of a fluid flowing in the primary fluid flow loop upstream of the inlet of a first one of the plurality of secondary fluid flow loops, the first one of the plurality of secondary fluid flow loops being fluidly coupled to a heat load;

a second temperature sensor coupled to the primary fluid flow loop, the second temperature sensor measuring the temperature of the fluid flowing in the primary fluid flow loop downstream of the outlet of the first one of the plurality of secondary fluid flow loops;

a third temperature sensor coupled to the primary fluid flow loop, the third temperature sensor measuring the temperature of a fluid flowing in the primary fluid flow loop downstream of the outlet of a second one of the plurality of secondary fluid flow loops, the second one of the plurality of secondary fluid flow loops being fluidly coupled to a heat source;

a processor in communication with the first, second, and third temperature sensors and the fluid flow meter, the processor being configured to:

multiply the difference between the measured temperatures of the second and first temperature sensors by the volume flow measured by the flow meter to determine the energy consumption rate of the heat load of the first one of the plurality of secondary loops; and multiply the difference between the measured temperatures between the third and second temperature sensors by the volume measured by the flow meter to determine the energy generation rate of the heat source of the second one of the plurality of secondary fluid flow loops.

* * * * *